United States Patent
Weisswange (10) Patent No.: US 9,669,830 B2
(45) Date of Patent: Jun. 6, 2017

(54) METHOD FOR ASSISTING A DRIVER IN DRIVING A VEHICLE, A DRIVER ASSISTANCE SYSTEM, A COMPUTER SOFTWARE PROGRAM PRODUCT AND VEHICLE

(71) Applicant: HONDA RESEARCH INSTITUTE EUROPE GMBH, Offenbach/Main (DE)

(72) Inventor: Thomas H. Weisswange, Offenbach (DE)

(73) Assignee: HONDA RESEARCH INSTITUTE EUROPE GMBH, Offenbach/Main (DE)

(*) Notice: Subject to any disclaimer, the term of this patent is extended or adjusted under 35 U.S.C. 154(b) by 0 days.

(21) Appl. No.: 14/720,101

(22) Filed: May 22, 2015

(65) Prior Publication Data
US 2015/0344031 A1    Dec. 3, 2015

(30) Foreign Application Priority Data

May 30, 2014 (EP) ..................... 14170552

(51) Int. Cl.
*B60W 30/14* (2006.01)
*G01S 7/24* (2006.01)
(Continued)

(52) U.S. Cl.
CPC ............. *B60W 30/14* (2013.01); *G01S 7/24* (2013.01); *G01S 7/295* (2013.01); *G01S 13/931* (2013.01);
(Continued)

(58) Field of Classification Search
CPC ......... B60W 2550/00; B60W 2550/10; B60W 2550/14; B60W 2550/20; B60W 2550/40; B60W 2550/402406; B60W 2550/408
See application file for complete search history.

(56) References Cited

U.S. PATENT DOCUMENTS 6,370,475 B1 * 4/2002 Breed ................. B60N 2/2863
340/436
7,272,474 B1 * 9/2007 Stentz ..................... G01C 7/04
701/26
(Continued)

FOREIGN PATENT DOCUMENTS

EP    1 731 922 A1    12/2006
EP    2 339 375 A2     6/2011
(Continued)

OTHER PUBLICATIONS

European Search Report dated Dec. 18, 2014 corresponding to European Patent Application No. 14170552.5.

*Primary Examiner* — Adam Tissot
*Assistant Examiner* — Tamara Weber
(74) *Attorney, Agent, or Firm* — Squire Patton Boggs (US) LLP (57) ABSTRACT

The invention regards to a method for assisting a driver in driving a vehicle, comprising the steps of producing sensor data by at least one sensor physically sensing the environment of a host vehicle and/or obtaining data conveying information about the environment of a host vehicle, generating a plurality of representation segments each segment being a portion of an entire area of representation of the environment of the host vehicle at a particular point in time wherein a relative position of the portion of such representation segment with respect to a current position of the host vehicle corresponds to a possible position of the host vehicle at that particular point in time, combining the representation
(Continued)

segments to a spatio-temporal representation of the environment of the host vehicle; evaluating the spatio-temporal representation and outputting an assistance signal on the basis of an evaluation result.

11 Claims, 4 Drawing Sheets (51) Int. Cl.
G01S 7/295 (2006.01)
G01S 13/93 (2006.01)
G08G 1/16 (2006.01)

(52) U.S. Cl.
CPC ............. *G08G 1/165* (2013.01); *G08G 1/166* (2013.01); *G08G 1/167* (2013.01); *B60W 2550/00* (2013.01)

(56) References Cited

U.S. PATENT DOCUMENTS

| | | | | |
|---|---|---|---|---|
| 8,457,827 | B1* | 6/2013 | Ferguson | G05D 1/00 180/169 |
| 2002/0183906 | A1* | 12/2002 | Ikeda | B62D 15/029 701/36 |
| 2006/0038885 | A1 | 2/2006 | Eggers et al. | |
| 2007/0027612 | A1* | 2/2007 | Barfoot | G05D 1/0297 701/117 |
| 2007/0239358 | A1* | 10/2007 | Okazaki | B60R 21/0134 701/301 |
| 2008/0162027 | A1* | 7/2008 | Murphy | B60W 50/14 701/117 |
| 2009/0024357 | A1* | 1/2009 | Aso | B60W 30/10 702/181 |
| 2010/0034423 | A1* | 2/2010 | Zhao | G06K 9/00785 382/103 |
| 2010/0082238 | A1* | 4/2010 | Nakamura | B60W 40/072 701/532 |
| 2010/0228419 | A1 | 9/2010 | Lee et al. | |
| 2012/0035798 | A1* | 2/2012 | Barfoot | G05D 1/0297 701/25 |
| 2012/0271518 | A1* | 10/2012 | Van Den Broek | B60W 30/0956 701/48 |
| 2013/0024103 | A1* | 1/2013 | Schneider | B60W 40/04 701/301 |
| 2014/0025331 | A1 | 1/2014 | Ma et al. | |
| 2014/0210644 | A1* | 7/2014 | Breed | G01S 17/936 340/905 |
| 2015/0046078 | A1* | 2/2015 | Biess | G08G 1/163 701/301 |

FOREIGN PATENT DOCUMENTS

| | | |
|---|---|---|
| WO | WO 2010/127650 A1 | 11/2010 |
| WO | WO 2013/087067 A1 | 6/2013 |

* cited by examiner

METHOD FOR ASSISTING A DRIVER IN DRIVING A VEHICLE, A DRIVER ASSISTANCE SYSTEM, A COMPUTER SOFTWARE PROGRAM PRODUCT AND VEHICLE

BACKGROUND

Field

The invention relates to a method for assisting a driver in driving a vehicle, a driver assistance system, a computer software program product and a vehicle including such driver assistance system.

Description of the Related Art

Over the last 50 years, the use of self-propelled vehicles for individual transportation and driving developed rapidly. In major parts of the world, nearly every household owns at least one such vehicle, for example a car. Accordingly, the density of traffic on the roads increased also rapidly. Participating in such dense traffic therefore, for most people, became no longer enjoyable but a burden. Thus, an increasing need for improved comfort in driving can be recognized. In order to comply with these needs, car manufacturers seek to assist a driver so that the driver can focus on the remaining actions that need to be taken when driving a car. For example, early driver assistance systems introduced a cruise control which assisted the driver in maintaining a constant speed even on an inclined road by automatically adapting the throttle of the engine. Early driver assistance systems of course were very limited in their capability. The example of the cruise control makes this obvious, because at the beginning no autonomous braking was included. Consequently, driving down a hill would lead to an undesired acceleration. Later systems overcame such deficiencies since they include also a brake system in the cruise control system. Thus, they were able to maintain a target speed independent of any inclination of the road. But still no reaction to the needs of the traffic environment was included.

A newer generation of driver assistance systems is called advanced driver assistance systems. Such systems take into consideration information about the environment so that for example warning signals in case of dangerous situations can be output or even an automatic control of the car may be performed in order to mitigate or entirely prevent critical situations. As an example, an adaptive cruise control senses the distance between the car equipped with such a system (host vehicle) and the preceding car and adapts the speed automatically. A first step towards an improved driver assistance system was made. Another example is an emergency braking system that can automatically initiate an emergency braking in case that an object can be recognized directly in front of the vehicle. These two examples given above are rather simple to implement, because the only information that is needed is information of the size of a free space in the longitudinal direction of the car. But since only a very limited part of the environment of the vehicle is taken into consideration for evaluation of the traffic situation, the capability and the usefulness of such system is also limited. Instead of braking for example it could be more advantageous to consider a lateral avoidance maneuver (lane change) so that no emergency braking would be needed. This of course would immediately need to take into account a lot more information about the environment of the host vehicle. In particular, determining strategies for vehicle maneuver in dense traffic needs anticipation of the future traffic situation or development of a scene so that for example a minimization of the risk of an accident may be achieved. Development of driver assistance systems does have the target to realize autonomous driving one day. It is obvious that this development therefore needs simultaneous consideration of information with an increasing complexity and in particular to take into consideration a plurality of behavior options of the traffic participants of a scene. Although, the performance of computing processors increases rapidly it is still a problem to make real time evaluation of situations due to the huge amount of data including the information about the environment of a vehicle.

The influence of the environment on the behavior of a vehicle driver is needed to be taken into consideration for anticipation of future traffic situations. The car the driver of which shall be assisted in driving (EGO-vehicle, host vehicle) is of course also part of the scene and thus covers a particular part of surface of this traffic scene. Which part it is, depends of course on the behavior of the host vehicle. The entire area of a traffic situation is a combination of area units each of these units having a particular quality. In this context, quality means that an estimation is given how likely it is that this particular unit may be traversed by a vehicle. For example, those area units occupied by another car have a very low probability to be traversed by another traffic object. An area unit corresponding to a free road on the other hand has a very high probability to be traversed by a car. As this easy example already reveals for anticipation of future traffic situations, it is most important that every part and object in the environment of the host vehicle is known and particular regarding its spatial extent and position. For the coverage of the environment of the host vehicle, there have already been a few proposals like for example in WO 2013/087067 A1 or EP 1 731 922 A1. But occupancy of a particular area in the environment of a host vehicle is only one aspect. Other rules and structures that cannot be taken into consideration by such occupancy grids nevertheless have a strong influence on the behavior of any traffic participant in a traffic situation. For example, although a zebra crossing is currently not used by a pedestrian who is already recognized besides the zebra crossing on the pavement, at the moment is a free road ahead. But there is a reasonable chance that the pedestrian stepping onto the zebra crossing and will cause a traffic participant to brake in order to stop in front of the zebra crossing. This example illustrates that the environment may change with time. As long as no person is on the zebra crossing, it might be considered a free lane ahead. But as soon as a person steps towards the zebra crossing, the zebra crossing has to be considered a forbidden area since the driver is demanded to let the pedestrian cross. Information about the presence and the position of a zebra crossing or information where the own lane, the opposing lane or a highway exit or the like is, is called semantics. In order to describe the development of a traffic situation that allows evaluation and maybe allows a suggestion for a particular behavior, it is thus necessary to have an environment representation that covers spatial, temporal and semantic information. Since this is a huge amount of information data there is a need for an efficient environment representation that includes all the information needed for a reasonable evaluation but is not burdened with information that is unnecessary.

EP 2 339 375 A2 is a first attempt to limit the complexity in which an environment representation is made. Instead of describing all the objects with their spatial relation, it is suggested to rather make a prediction of the change of the free space. Thus, the free space can be identified as being one object that transforms with time. Although this in fact reduces the amount of data that is needed to describe a free space it has a big disadvantage. The limitation to information about the free space on the other hand results in the disability of predicting future movement behavior of other traffic participants since they are no longer part of the information about the environment.

SUMMARY

Thus, it is an object of the present invention to provide an efficient representation of the environment of the host vehicle of a driver assistance system that includes information on temporal development of a scene. This object is achieved by the method, the driver assistance system, the computer software program product and the vehicle according to the independent claims. Advantageous aspects are defined in the dependent claims.

According to the present invention, information about the environment of a host vehicle on which the driver assistance system is mounted is obtained at first. There are several ways possible in order to obtain such information. For example, the information about the environment can be gathered by producing sensor data, for example a radar system or an imaging device of the host vehicle. Alternatively, car-to-X communication could be used to obtain data. After such data is obtained or generated from physically sensing the environment, a representation of the environment is generated. This representation is generated using a plurality of representation segments. Each of such segments is a portion of an entire area of representation of the environment of the host vehicle at a particular point in time. "Entire area of representation" of course covers only a limited space in the surrounding of the host vehicle, the size of which may be limited on the basis of an area covered by the sensors. The particular point in time of each representation segment corresponds to a relative position the host vehicle has at that particular point in time. This means that following the host vehicle each segment represents a portion of the representation of the environment where the host vehicle is at that point in time. The different representation segments are then combined to form a spatial-temporal representation of the environment of the host vehicle. This spatial-temporal representation of the environment of the host vehicle thus consists of a plurality of representation segments which is the representation of a relevant portion of the environment at a relevant time. Nevertheless, an entire area of representation of the environment is achieved in which calculations for predictions for future movement behaviors either of the host vehicle or of any other traffic participant or both can be performed. Such a combined representation gives a lot of information so that a reasonable evaluation of traffic situations may be performed but avoids that for any point in time every available information is present. Thus, the data amount used for further evaluation is reduced considerably without losing the option of predicting traffic participant behaviors. According to the invention, this spatial-temporal representation is then evaluated and an assistance signal is output on the basis of the evaluation result. Such assistant signal can for example be used to control output of a warning message which in case that for the host vehicle a critical traffic situation can be evaluated.

Preferably, the representation segments have a predetermined shape and the discrete points in time corresponding to such a representation segment is determined based on the host vehicle's philosophy. In an easy realization, this can be the linear velocity of the host vehicle at a current point in time. More complex solutions predict a trajectory of the host vehicle which can be for example based on a most likely behavior of the host vehicle.

Such estimation of the discrete points in time consequently can be performed using an extrapolation of the current dynamics of the vehicle. This means that the current velocity is determined once and a prediction for future positions of the vehicle is made based only on the current linear velocity. Alternatively, in one step a plurality of possible behavior options are determined which are stereotype for the host vehicle in such situations and the positions of the host vehicle of these stereotype behavior options are mapped onto the entire area of the representation. A further possibility is to generate a probabilistic or deterministic summation of all possible behaviors of the host vehicle or to make an explicit prediction of the most likely executed future behavior of the host vehicle.

Each representation segment corresponds to a portion of the grid of the entire representation of the environment. Such grid consists of a plurality of units forming the surface of the environment and in order to add the information about the environment of the host vehicle to the representation segment, at least a plurality of such units are labeled. These semantic labels are predicted for the particular point in time for generating the representation segments at that particular point in time. The representation segments thus can be generated by two different methods:

Firstly, the prediction of the semantic labels for the units of one representation segment is performed only for the units of this representation segment or secondly, the representation segment is cut out from an entire area representation for which the prediction of the semantic labels has been performed.

Preferably, the labels for each unit comprise information not only with respect to a single piece of information, but to information coming from a plurality of data sources. In that case it is of course needed to determine what the label of this particular unit shall be like. One simple possibility is that in case of a plurality of pieces of information that are obtained for each information source there is defined a particular priority. Based on such a priority indication, prioritized data source is selected for providing the information for generating the label of the unit. Alternatively, a label vector can be generated by associating information from different data sources to one label each and then combining such plurality of labels to said label vector. A further alternative is the use of a multidimensional distribution of a probability of a number of labels or that a plurality of labels would be available because information of different data sources is obtained for the combination of such labels a new label is created which is then used to describe the environmental information regarding this particular unit.

Labels in the sense of the present invention can be any information or characteristic about one unit of the entire representation of the environment. Examples for such labels may be: Road, host vehicle lane, adjacent lane, opposing lane, incoming road, outgoing road, bicycle lane, walkway, entrance, pothole, off-road, ice, snow, emergency lane, highway entrance, highway exit, occupied road, static occupied, static vehicle, dynamic vehicle, safety area around/next to particular parts of traffic participants/structures, stopping area, one-way street, parking space, intersection area, historically dangerous area, puddle, zebra crossing, active zebra crossing, traversable obstacle, road debris, animal crossing area, free area, unknown area, pedestrian zone, bus stop, bus lane, traffic island, cobblestone, slippery road, slanted road, speed bump, wet road, train rails, gravel, etc.

According to another particularly preferred embodiment, on the basis of the generated entire representation of the environment possible future behaviors of at least one traffic participant are compared and then its future movement behavior is predicted. It is particularly preferred to predict such future movement behavior for the host vehicle and/or other traffic participants like other vehicles but of course also pedestrians for any other moving object.

In another preferred embodiment, the predicted future movement behavior of other traffic participants is then again used for the generation of the representation segments. Thus, in an iterative way, the generated representation segments and then of course the combination of these representation segments, can be approximated to the real traffic situation. For calculating the future movement behaviors, at least two distinct ways are possible. At first it is possible to evaluate the future movement behaviors individually for each representation segment. Furthermore, the evaluation can be made as a trajectory which is independent from a particular representation segment. Thus, the trajectory of a possible future movement behavior of a vehicle is calculated and then mapped to the segments in order to generate the representation segments.

Furthermore, it is preferred that in the evaluation step the size of the host vehicle or the size of the host vehicle plus an additional safety area is taken into consideration. Since the entire representation of the environment includes a lot of information, this has in particular the advantage that not only the position being a single point of the host vehicle is used, but also for example the width of the host vehicle so that it can easily be determined if the remaining space between a plurality of obstacles is sufficient for planning a trajectory in case of an escape maneuver for example.

BRIEF DESCRIPTION OF THE DRAWINGS

The invention will now be described with respect to the preferred embodiment and using the drawings annexed. In the drawings

DETAILED DESCRIPTION

Figure 1:
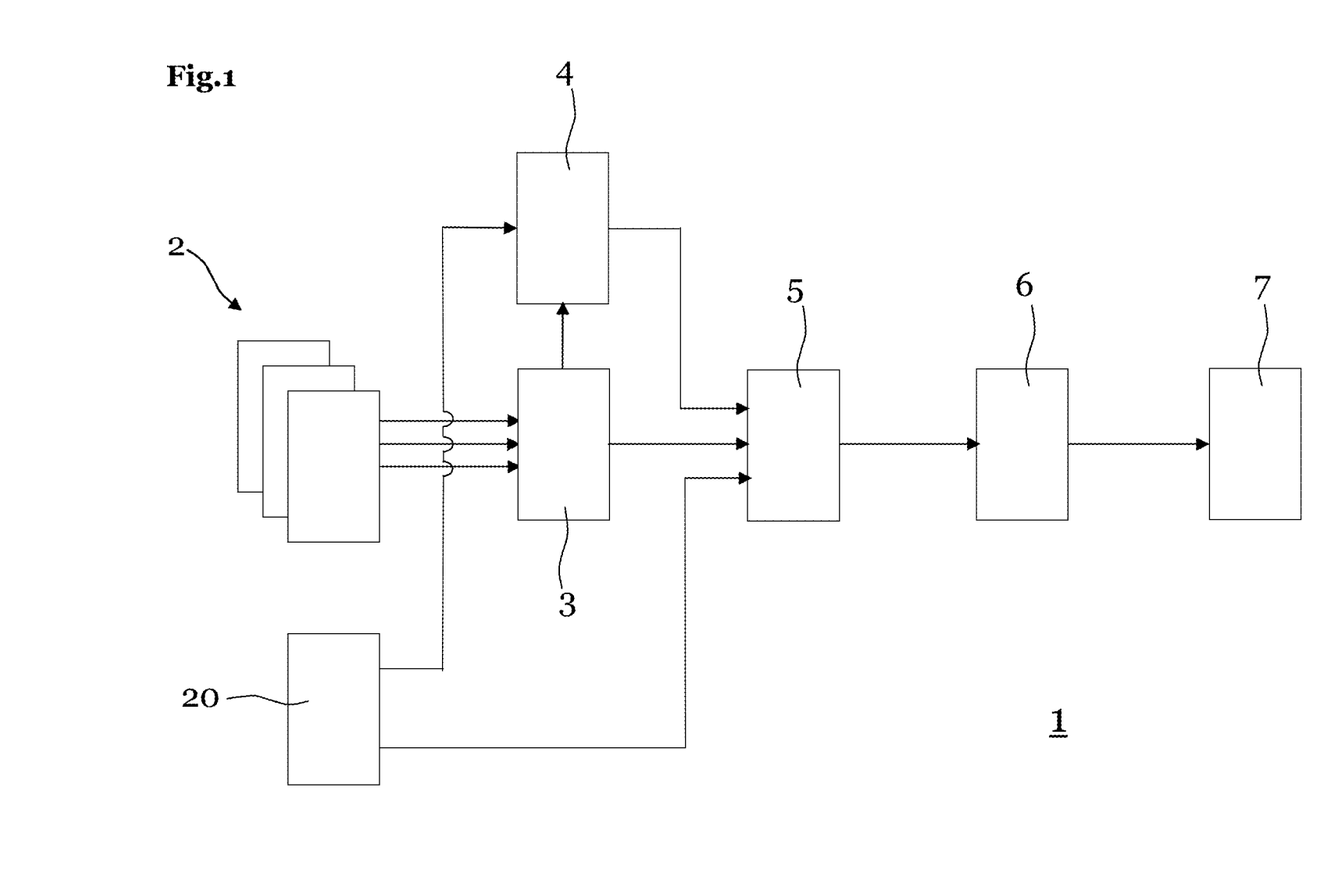
FIG. 1 is an overview over the system showing its components/modules.

FIG. 1 shows a system according to the invention which is mounted in a vehicle. The system 1 comprises a plurality of information sources 2 each of which delivers information about at least a portion of the area of the environment to be represented by the final spatio-temporal representation. Such information sources may be for example sensor systems that sense the environment of the host-vehicle on which the system is mounted physically by use of plural sensors. The sensors used may be radar, lidar or acoustic sensors. Another system could be an image processing system that delivers based on images captured by a camera information about the existence and positions of lane markings, traffic signs, zebra crossing, borders of lanes or any objects that can be identified from captured images. The further information source that could be used is an interface that receives information of car-to-X communication systems that deliver information about position and velocity of other traffic participants.

The information that is delivered from the sensing systems 2 is supplied to a spatial information fusion unit 3. In the spatial fusion unit 3 information regarding a same position relative to the host vehicle, corresponding to one unit in a representation map are fused. Fusing such information can be performed in various ways. One possibility is to use only information supplied by a prioritized information source so that every position corresponding to one unit of an area to be represented is labeled only with one label according to this information source. Nevertheless in order not to lose any information which is obtained it is preferred that the information coming from the different information sources are kept. This may be achieved by using one respective label for each information source and combining a plurality for all of the labels to a label vector so that each unit of the area to be represented is described by a label vector including this plurality of labels. It is to be noted that of course each information source may deliver information which corresponds to a plurality of different labels. As mentioned above, in particular an image processing system can deliver information for several distinct labels. The outcome of the spatial fusion unit 3 is a description of the environment in an entire area that is to be represented, at a current point in time.

The result of the spatial fusion unit 3 is forwarded to a label prediction unit 4 and a spatio-temporal fusion unit 5.

In the label prediction unit 4 the labels are predicted for particular points in time. It will be explained later how these particular points in time are determined. The result of the label prediction unit 4 is supplied to the spatio-temporal fusion unit 5 where the spatio-temporal representation of the environment is generated.

In order to determine representation segments of what points in time are to be fused in the spatio-temporal fusion unit a trajectory of the host vehicle is determined which is a basis for the determination of the particular points in time that are needed for the prediction of the labels at that point in time. If the host vehicle drives on a road it will pass different positions of that road as time goes by. For a given size of the representation segment it can thus be determined from the trajectory of the host vehicle when the host vehicle enters the next segment. This particular point in time is the point in time for which the labels of the next representation segment are to be determined. In the easiest realization only two representation segments are determined and then in the spatio-temporal fusion unit 5 combined. Of course it is obvious that a plurality of representation segments for a higher number of particular points in time can be generated and combined. In the spatio-temporal fusion unit 5 the representation segments are generated on the basis of the predicted labels received from the label prediction units 4. This can be performed in two different ways:

1. The representation segment is generated only for the area of the representation segment for which the label prediction unit 4 makes a prediction only.
2. The label prediction unit 4 predicts the labels for every unit of the entire area of representation and in the spatio-temporal fusion unit 5 this entire area of representation of the environment is generated for each particular point in time. After that based on the information about the particular points in time the respective portion of the entire area of representation corresponding to the point in time is cut out to form the representation segment. Then the representation segments are combined to form the spatio-temporal representation. The spatio-temporal representation is then supplied to a behavior evaluation unit 6 were an evaluation process on the behavior of the host vehicle and/or other traffic participants is performed. As an outcome an assistant signal is generated which is used to control an actuator 7 of the host vehicle or a warning signal producing device 7 or the like. In the behavior evaluation unit 6 it is for example evaluated that predicted behaviors of the different traffic participants or at least one traffic participant or only the host vehicle may lead to a critical driving situation. In that case a warning may be output or the driving conditions of the host vehicle may be influenced actively. This can be performed for example by reducing the speed.

Figure 2:
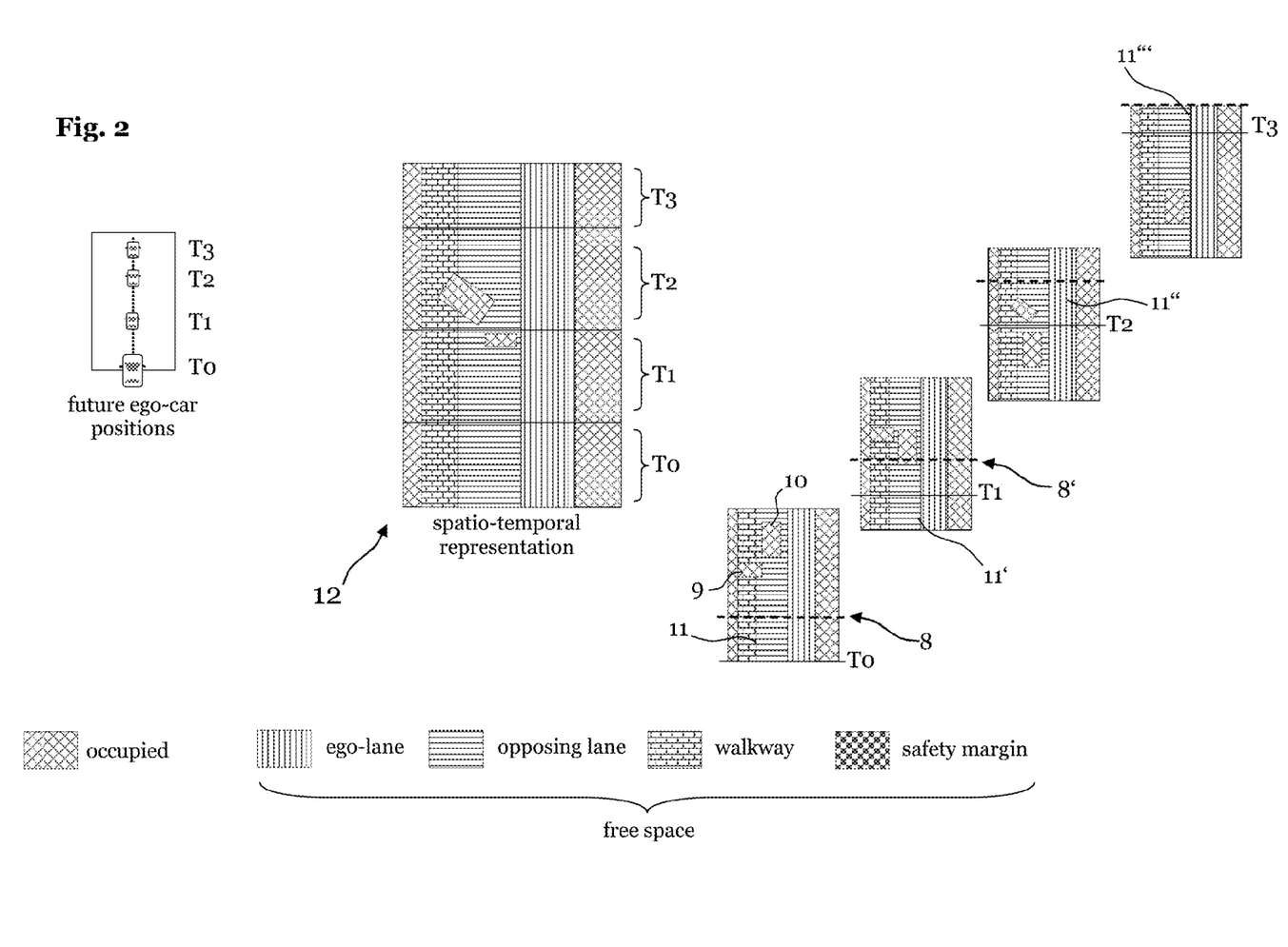
FIG. 2 is a first example for generating a spatio-temporal representation of the environment.

FIG. 2 shows an example how the spatio-temporal representation is generated according to the invention. At the right side of the drawing the entire environment of the vehicle which is to be represented is illustrated. Here it is an area in front of the host vehicle. It is assumed that the host vehicle is driving on a right lane of a road with only two lanes, one for each driving direction. The entire area is shown at four different points in time T0 . . . T3. Each surface unit of this entire area is denoted by at least one label representing an information relevant for driving the host vehicle. Preference numeral 8 shows the entire area of representation at point in time T0. At this point in time two other traffic objects 9 and 10 can be identified. Traffic object 10 is driving on an opposing lane and traffic object 9 is coming from an area outside the road. The surface units that correspond to the size of these traffic objects 9 and 10 are labeled as occupied. Also the sides of the road where the vehicle cannot drive, for example if there are houses or walls that prohibit that a vehicle may drive there, are also labeled as occupied. The illustration of the entire area 8 furthermore shows that the lane on which the host vehicle drives, called ego-lane, is labeled different from the opposing lane. Next to the opposing lane a walk way is identified which is accordingly labeled as walk way.

The same entire area of representation is illustrated for a later point in time T1 and is denoted with reference numeral 8'. At T1 the host vehicle is assured to have reached the line next to T1. It can be recognized that only one thing has changed in the meantime which is traffic object 10 that moves towards the host vehicle on the opposing lane. 8" is the same area again at a later point in time where it can be seen that traffic object 9 now drives onto the opposing lane after traffic object 10 has passed. Finally 8"' is the same area at T3.

Assumed that the host vehicle drives at constant speed on the ego lane it passes the horizontal lines at T0 to T3 as indicated in the entire areas of representation 8 to 8"'. In the illustrated embodiment the representation segments have been defined by a rectangular shape and the points in time T1 to T3 that are equidistant define the size of the representation segment. This means that for a given shape of the representation segment it can be calculated on the basis of the current speed of the host vehicle where the vehicle is at T1. Thus, T0 and T1 define the edges of the first representation segment.

Of course the calculation of the positions at T1 can be improved by predicting the future behavior of the host vehicle so that not only the constant velocity of the host vehicle has to be assumed but a predicted trajectory can be used in order to determine the positions at different points in time.

After the positions for particular points in time T0 (which is of course the current time) and T1 to T3 have been determined the corresponding representation segments are cut out from the entire area of representations at these points in time 8 to 8"'. The cut out representation segments 11 to 11"' are then combined to form the spatio-temporal representation 12.

Figure 3:
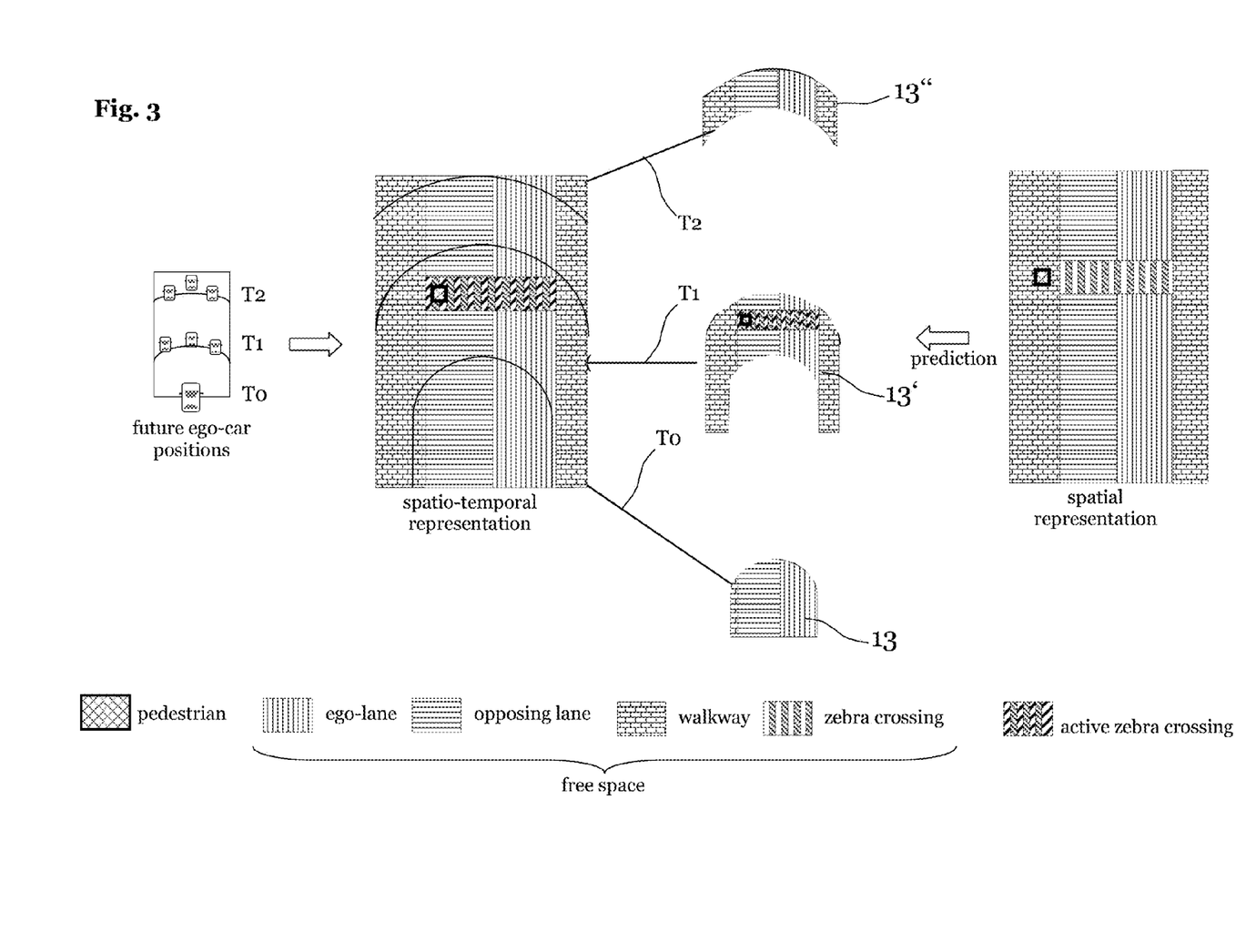
FIG. 3 is a second example for a spatio-temporal representation of an environment

The first example for a spatio-temporal representation uses representation segments that all have equal shape. A different example is given in FIG. 3 where successive representation segments (successive with respect to time) differ in shape and size. The segments are partially circular. In this example starting from an entire area of representation shown rightmost in FIG. 3 showing the situation at a current point in time T0 at first the representation segments are cut out and then the prediction of the labels is performed with respect to the cut out segments only. This is illustrated by the segments 13, 13' and 13". The example furthermore shows that a zebra crossing is present in the entire area which is in the rightmost initial state labeled as a free zebra crossing but in the representation segment 13' the label changed because of a movement of the pedestrian who is predicted to walk across the street using the zebra crossing. The label of the zebra crossing is thus changed to active zebra crossing.

Figure 4:
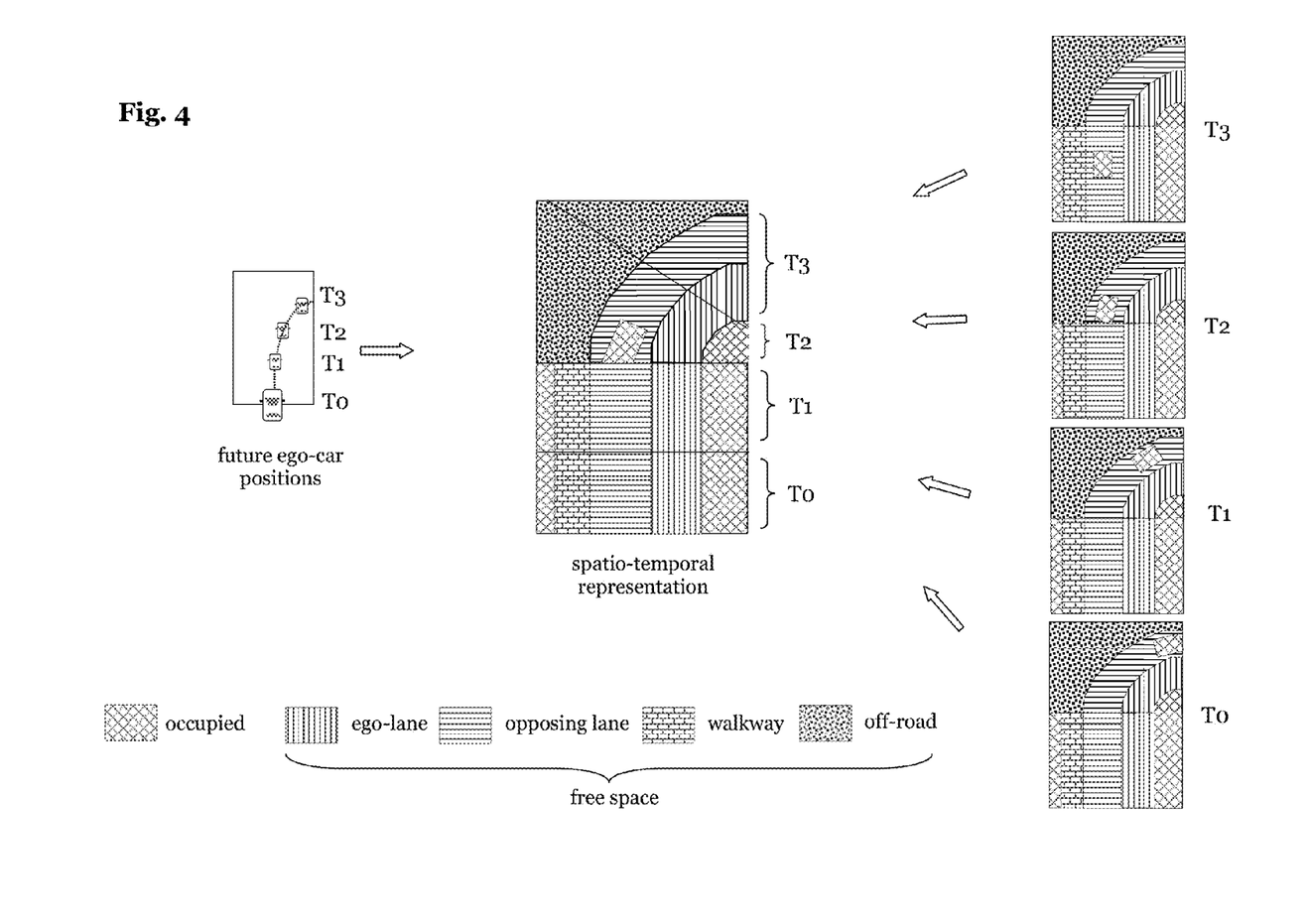
FIG. 4 is a third example for a spatio-temporal representation of an environment.

A last example is given in FIG. 4 from where it can be recognized that the orientation of the representation segments may change due to a trajectory of the host vehicle. In the illustrated example the road makes a turn to the right and thus representation segments as shown in the first example are disadvantageous. Thus, as it is predicted that the host vehicle will follow its lane and drives a curve to the right the segments are adapted with respect to their position and size. One possible solution is that the border of the segment is orthogonal to the trajectory of the host vehicle. The spatio-temporal representation is then used as a basis for evaluation in an advanced driver system.

The invention claimed is:

1. A method for assisting a driver in driving a host vehicle, comprising the steps of:
performing at least one of producing sensor data by at least one sensor physically sensing the environment of the host vehicle and obtaining data conveying information about the environment of the host vehicle;
generating, based on at least one of the sensor data and the information about the environment of the host vehicle, for each of different points in time, including present and future, a representation segment to provide timewise and spatially adjacent representation segments, each of the representation segments being a portion of a grid of an entire area of representation of the environment of the host vehicle at a particular point in time, wherein a relative position of the portion of at least one of the representation segments with respect to a current position of the host vehicle corresponds to a possible position of the host vehicle at the particular point in time and the grid comprises units forming surface of the environment, wherein information relevant for driving the host vehicle is assigned to at least a plurality of the units and the representation segments are generated by prediction of semantic labels of the plurality of units of the representation segment for the particular point in time, or by cutting out at least one of the representation segments from an entire area representation having the predicted semantic labels of the plurality of units;
connecting the timewise and spatially adjacent representation segments to form a single two-dimensional spatio-temporal representation of the environment of the host vehicle that comprises a plurality of timewise and spatially consecutive segments representing relevant spatial portions of the environment at their respective relevant time;

performing an evaluation process on behavior of at least one of the host vehicle and other traffic participants based on the spatio-temporal representation; and outputting an assistance signal on the basis of an evaluation result to control an actuator or a warning signal of the host vehicle.

2. The method according to claim 1, wherein
the representation segments have a predetermined shape and a corresponding discrete point in time is determined based on the host vehicle's velocity.

3. The method according to claim 2, wherein the discrete point in time corresponding to each representation segment is estimated by one of:
   an extrapolation of a current dynamics of the vehicle,
   mapping of one or multiple stereotyped behavior options of the host vehicle onto the entire area of the representation,
   a probabilistic or deterministic summation of all possible behaviors of the host vehicle, and
   an explicit prediction of the most likely executed future behavior of the host vehicle.

4. The method according to claim 1, wherein
information about the environment of the host vehicle obtained from a plurality of data sources is associated with its corresponding unit of the representation by at least one of:
   generating one label for each unit the label corresponding to information only from a prioritized data source,
   associating information from each data source to one label respectively and combining these labels to a label vector,
   using a multidimensional distribution of a probability of a number of labels, and
   creating a new label from a plurality of labels corresponding to individual information.

5. The method according to claim 4, wherein labels include information about at least one of the following semantic characteristics:
   road, host vehicle lane, adjacent lane, opposing lane, incoming road, outgoing road, bicycle lane, walkway, entrance, pothole, offroad, ice, snow, emergency lane, highway entrance, highway exit, occupied road, static occupied, static vehicle, dynamic vehicle, safety area around/next to particular parts of traffic participants/structures, stopping area, one-way street, parking space, intersection area, historically dangerous area, puddle, zebra crossing, active zebra crossing, traversable obstacle, road debris, animal crossing area, free area, unknown area, pedestrian zone, bus stop, bus lane, traffic island, cobblestone, slippery road, slanted road, speed bump, wet road, tram rails, gravel.

6. The method according to claim 1, wherein
in the step of performing the evaluation process a plurality of possible future movement behaviors of a traffic participant are compared and its future movement behavior is predicted.

7. The method according to claim 6, wherein the prediction is conducted for at least one of the host vehicle and other traffic participants.

8. The method according to claim 6, wherein the predicted future movement behavior of other traffic participants is used for the generation of the representation segments.

9. The method according to claim 6, wherein the possible future movement behaviors are evaluated individually for each of the representation segments or are evaluated as representation segment independent trajectories.

10. The method according to claim 1, wherein in the performing of the evaluation process the size of the host vehicle or the size of the host vehicle plus an additional safety area is taken into consideration.

11. A computer software program product embodied on a non-transitory computer-readable medium, said product performing a process, when executed on a computer, the process comprising:
   performing at least one of producing sensor data by at least one sensor physically sensing the environment of the host vehicle and obtaining data conveying information about the environment of the host vehicle,
   generating, based on at least one of the sensor data and the information about the environment of the host vehicle, for each of different points in time, including present and future, a representation segment to provide timewise and spatially adjacent representation segments each of the representation segments being a portion of a grid of an entire area of representation of the environment of the host vehicle at a particular point in time, wherein a relative position of the portion of at least one of the representation segments with respect to a current position of the host vehicle corresponds to a possible position of the host vehicle at the particular point in time and the grid comprises units forming surface of the environment, wherein information relevant for driving the host vehicle is assigned to at least a plurality of the units and the representation segments are generated by prediction of semantic labels of the plurality of units of the representation segments for the particular point in time, or by cutting out at least one of the representation segments from an entire area representation having the predicted semantic labels of the plurality of units,
   connecting the timewise and spatially adjacent representation segments to form a single two-dimensional spatio-temporal representation of the environment of the host vehicle that comprises a plurality of timewise and spatially consecutive segments representing relevant spatial portions of the environment at their respective relevant time;
   performing an evaluation process on behavior of at least one of the host vehicle and other traffic participants based on the spatio-temporal representation; and
   outputting an assistance signal on the basis of an evaluation result to control an actuator or a warning signal of the host vehicle.

* * * * *